Figure 1:
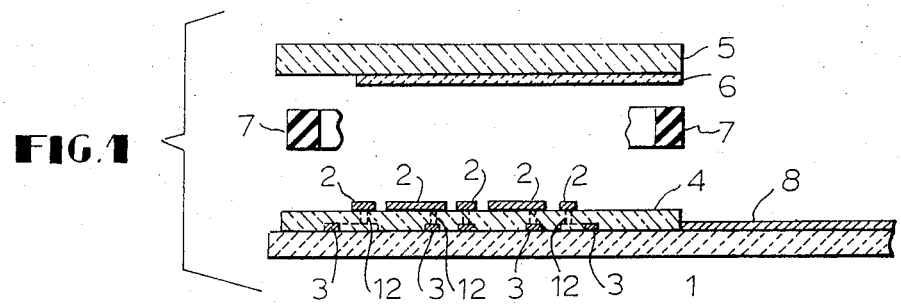

United States Patent
Mikoda et al.

[11] 3,966,302
[45] June 29, 1976

[54] PANEL FOR LIQUID CRYSTAL DISPLAY AND METHOD OF MAKING

[75] Inventors: Masanari Mikoda, Neyagawa; Hisashi Akatani; Shigeru Hayakawa, both of Hirakata, Japan

[73] Assignee: Matsushita Electric Industrial Co., Ltd., Osaka, Japan

[22] Filed: Oct. 16, 1974

[21] Appl. No.: 515,359

[30] Foreign Application Priority Data
Oct. 19, 1973 Japan............................ 48-118196

[52] U.S. Cl............................ 350/160 LC; 29/592
[51] Int. Cl.² ........................................ G02F 1/16
[58] Field of Search............................ 29/626, 592; 350/160 LC

[56] References Cited
UNITED STATES PATENTS 3,834,791   9/1974   Raimbault .................... 350/160 LC
3,846,015   11/1974  Moi ............................. 350/160 LC

*Primary Examiner*—Eli Lieberman
*Attorney, Agent, or Firm*—Wenderoth, Lind & Ponack

[57] ABSTRACT

A panel for a liquid crystal display device has a ceramic substrate, lead conductors on the ceramic substrate, an insulating glass layer over the lead conductors and the ceramic substrate, rear segment electrodes on the glass layer which are electrically connected to the respective lead conductors, a transparent glass plate spaced from the rear segment electrodes by a spacer enclosing the space, and transparent front electrodes on the transparent glass plate and facing the rear segment electrodes. The front and the rear segment electrodes are energized for exciting a liquid crystal within the space. This invention also provides a method of making the panel. The main feature of this invention is to use the ceramic substrate and to form the lead conductors on the ceramic substrate, which conductors are electrically connected to the rear segment electrodes on the glass layer, thereby enabling easy manufacturing and contributing to uniform and efficient display.

10 Claims, 2 Drawing Figures

U.S. Patent  June 29, 1976  3,966,302

PANEL FOR LIQUID CRYSTAL DISPLAY AND METHOD OF MAKING

This invention relates to a panel for a liquid crystal display device, particularly to such a panel for a desk-top type calculator in which a display part and a driving circuit part are integrally formed on the same substrate.

Conventionally, in a panel for a display device such as that of a desk-top type calculator, nixie tubes or light emitting diodes are used for numerical display. In such a panel, it is very difficult to form on the same substrate the numerical display part and a driving circuit part. Therefore, these two parts are formed on two substrates, respectively.

Recently, panels for display devices using liquid crystals have become available. In an advanced form of such a panel, a numerical display part and a driving circuit part are formed on one glass substrate. More specifically, on one small part of one surface of a glass substrate, thin rear segment electrodes with leads and disposed in a pattern to form numbers are formed e.g. by a vacuum deposition of $In_2O_3$ or $SnO_2$. On a different major part of the same surface of the same glass substrate, a driving circuit pattern is formed. Usually, for electrically connecting circuit elements to the driving pattern, soldering or welding is used. However, in order to do this, the driving circuit pattern is required to be quite heat resistant. To this end, the driving circuit pattern is formed e.g. by using thick film technology, i.e. applying conductive pastes including glass frits in the desired pattern to be electrically connected to the leads of the rear segment electrodes and heating them. The necessary circuit elements such as an IC and an LSI are connected to the driving circuit pattern. A spacer is mounted on the glass substrate around the rear segment electrodes, and a glass plate having thin transparent front electrodes on one surface thereof, in positions opposed to the rear segment electrodes is mounted on the spacer so as to define a chamber within the spacing means and between the substrate and the glass plate to receive a liquid crystal. The liquid crystal is excited by energizing the front and the rear segment electrodes. Thus, the glass plate per se can advantageously act as a window for the numerical display.

However, a glass substrate is not very heat resistant, and there is a limit to the temperature which can be used for heating the conductive pastes in the thick film technology. In the case of borosilicate glass, the upper limit for the heating temperature is 700°C, and in the case of a soda-lime glass, it is 500°C. The lower the heating temperature, the less heat resistant the rear segment electrodes or leads need be. Further, since a glass substrate is likely to be deformed by being heated, it is difficult to obtain a good panel for display. This deformation of the glass substrate is a serious problem because the liquid crystal in the display device requires good uniformity of both the thickness and the flatness. Usually, deviations from the flatness of the surface of the glass substrate should be less than 1 micron. In polishing the glass substrate, it is usually necessary to polish the whole surface of the glass substrate. This polishing is a troublesome and time consuming job. Even if a good surface flatness is obtained by the polishing, the surface smoothness is likely to be damaged, and many flaws often occur in the surface of the glass substrate. Since thin film segment electrodes are formed on the glass substrate, the flaws are often viewable through the liquid crystal on the segment electrodes, resulting in bad quality of the liquid crystal display. Further, it requires a very precise and complicated technique to form the segment electrodes with leads by vacuum deposition. In order to obtain a clearer numerical display, the distance between adjacent segement electrodes should be small. But the leads of the segment electrodes are required to lie on the glass substrate and pass through spaces between segment electrodes on the same glass substrate. Thus, usually the shortest distance between adjacent segment electrodes is not less than about 300 microns. Furthermore, such segment electrodes or the leads thereof are likely to be broken off or undesiredly short-circuited. Moreover, the ends of the leads of the segment electrodes are required to be covered by conductive pastes and heated for forming the driving circuit pattern. But when heated, the ends of the leads of the segment electrodes are likely to be attracted to the conductive pastes, resulting in separation of the leads from the conductive pastes. Because of these problems, the conventional panel is expensive to produce and not very reliable. A further disadvantage of using a glass substrate is in an inefficient use of reflected light in the display device. That is, the glass substrate does not efficiently reflect light coming through the front glass plate and the liquid crystal.

Accordingly, an object of this invention is to provide a panel for a liquid crystal display device which is easy to manufacture.

Another object of this invention is to provide a panel for a liquid crystal display device which is inexpensive and reliable, and which contributes to uniform, efficient and good quality display.

A further object of this invention to provide a method of making a panel for a liquid crystal display device, which method is easy to carry out and which contributes to the making of uniform, efficient and good quality display.

The panel for a liquid crystal display device according to this invention comprises: a ceramic substrate; an insulating glass layer over the ceramic substrate and covering the lead conductors, the glass layer having electrical conductors therein which are spaced from each other and are electrically connected to the respective lead conductors and which have portions which extend through the thickness of the glass layer; rear segment electrodes disposed in a pattern to form the desired display on the surface of the glass layer opposite to the surface of the glass layer facing the ceramic substrate; a spacer on said substrate around said rear segment electrodes; and a transparent glass plate having transparent front electrodes on one surface thereof opposed to the rear segment electrodes, the glass plate being mounted on the spacer spaced from the glass layer, the glass layer, spacer and glass plate defining space therebetween which is to be filled with a liquid crystal, the front and rear segment electrode. being for exciting the liquid crystal. The insulating glass layer preferably contains colored pigments, more preferably black pigments. The ceramic substrate is preferably an alumina or forsterite ceramic substrate.

The method of making a panel for liquid crystal display according to this invention comprises: forming lead conductors on one surface of a ceramic substrate; covering the lead conductors and the ceramic substrate with an insulating glass layer having holes therethrough which are spaced from each other in a manner such that the holes are positioned over parts of the respective lead conductors; filling the holes with conductive material so as to place it in electrical contact with the respective lead conductors; forming rear segment electrodes on one surface of the glass layer opposite to the surface of the glass layer facing the ceramic substrate in a pattern to form the desired display and in contact with the conductive material in respective holes; and attaching a transparent glass plate having transparent front electrodes on one surface thereof to the glass layer by spacing means in a manner such that the front electrodes face the rear segment electrodes with a space therebetween, which space is to be filled with a liquid crystal, the front and rear segment electrodes being for exciting the liquid crystal. The lead conductors, the insulating glass layer and the rear segment electrodes are preferably formed by using suitable printable materials, printing them and heating them.

Figure 2:
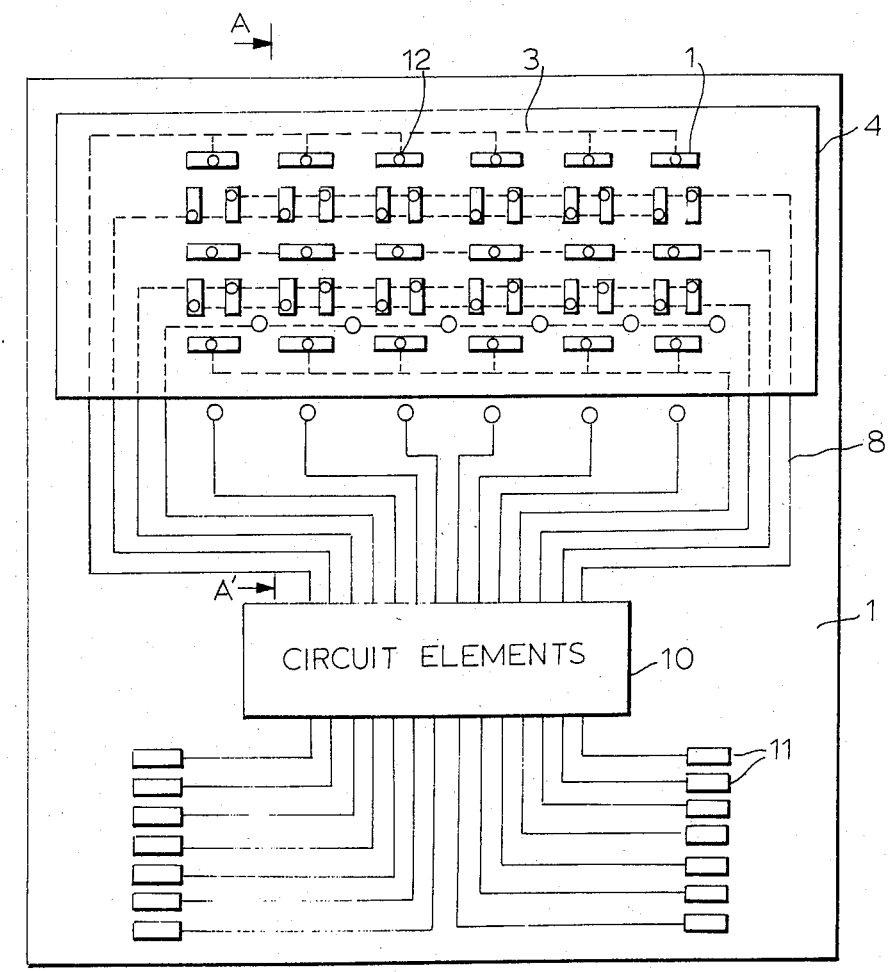

These and other objects and features of this invention will be apparent upon consideration of the following description taken with the accompanying drawings, in which:

FIG. 1 is a schematic cross-sectional view of a panel for a liquid crystal display device according to this invention taken along the line A—A' in FIG. 2, in which a front glass plate and spacers are shown as separated from a ceramic substrate with a glass layer and lead conductors, for the sake of easy understanding; and FIG. 2 is a schematic top plan view of a panel for a liquid crystal display device for showing the technical concept of this invention.

Details of this invention will be described hereinafter with reference to FIGS. 1 and 2.

Referring to FIGS. 1 and 2, reference numeral 1 designates a ceramic substrate. Any suitable and available ceramic material can be used therefor. For example, alumina ceramic and forsterite ceramic can be used. Alumina ceramic which is commercially available usually has deviations from the flatness of ± 2 microns. Therefore, a substrate of such alumina ceramic can be used without treating the surface thereof. Deviations from the surface flatness of the ceramic substrate are preferably less than 10 microns.

Lead conductors 3 are formed on the surface of the ceramic substrate 1 in a desired pattern such as shown by broken lines in FIG. 2. According to this invention, the leads covered by a glass layer 4 are defined as lead conductors, although they are not different in nature from leads 8 of the driving circuit pattern. Since the substrate 1 is made of a ceramic, the lead conductors 3 can be formed by using thick film technology. Moreover, the lead conductors 3 and the driving circuit pattern 8 can be formed at the same time. Further, because rear segment electrodes 2 are not formed on the same substrate 1 and it is not necessary to form any one of the lead conductors 3 very near any other conductive elements, it is very easy to form the lead conductors 3. The lead conductors 3 and the leads 8 of the driving circuit pattern are preferably formed at the same time by applying conductive pastes in a desired pattern such as shown by FIG. 2, e.g. by using screen printing, and heating them. For a conventional conductive paste containing silver and glass frit, the heating temperature is preferably between 780°C and 840°C, and the heating time is 5 minutes to 20 minutes, but these conditions are not very restricted and depend on the kinds of conductive pastes used. The thickness and width of the lead conductors can be chosen as desired. For example, a thickness of 10 microns and a width of 150 microns can be employed.

After the lead conductors 3 are completed, an insulating glass layer 4 is formed to cover the lead conductors 3 and to support rear segment electrodes 2. Any suitable and available technique can be used for forming the glass layer 4. The existence of the ceramic substrate 1 improves the clearness of the resultant liquid crystal display. However, in order to increase such clearness, colored pigments (preferably black) can advantageously be included in the glass layer 4. Thus, the glass layer 4 is preferably formed by: applying a glass layer material comprising glass frit, an organic binder such as ethylcellulose and an organic solvent onto the ceramic substrate to cover the lead conductors 3 in a desired form such as shown by FIGS. 1 and 2 by using e.g. screen printing; and heating the same. The heating temperature preferably does not exceed that used in forming the lead conductors 3. Conveniently, the heating for forming the glass layer 4 is carried out under the same conditions as that for forming the lead conductors 3 (and driving circuit pattern 8). According to this invention, it is necessary to electrically connect the lead conductors 3 to respective segment electrodes 2. To this end, in printing the glass layer material on the ceramic substrate 1, a screen for preventing printing of the glass layer material at necessary points and thus causing the formation of holes 12 through the glass layer 4 can be used. This technique of printing a paste while leaving holes therethrough is per se available. By using such a technique, holes can be provided in the resultant glass layer 4 in positions such that parts of the lead conductors 3 can be observed through the holes, i.e. the holes are positioned over necessary parts of the respective lead conductors 3 so as to partially expose the lead conductors therethrough as shown in FIGS. 1 and 2. The thickness of the glass layer 4 can be chosen as desired. For example, a layer with a thickness of 20 microns can be easily made. The diameter of the holes 12 can also be made as large as desired such as 400 microns.

When the holes 12 have been formed, it is preferred to insert electrical conductors into the holes for electrically connecting the lead conductors 3 and respective segment electrodes 2. When placed in the holes 12, the electrical conductors are spaced from each other by the glass of the glass layer 4. A preferred method of inserting the electrical conductors into the holes is to fill the holes 12 with conductive paste e.g. by using screen printing, and heat the paste at a temperature not exceeding the heating temperature for forming the glass layer 4. Conveniently, the heating conditions for the conductive filler are the same as those for the glass layer 4. This step of placing conductors in the holes, however, can in some case be omitted when the holes can effectively be filled with the material applied by the step of forming segment electrodes 2 which will be described later. The surface of the glass layer 4 is preferably polished e.g. by using a diamond paste so that any deviations from surface flatness are less than 1 micron. According to this invention, the required surface flatness of the glass layer 4 used in the conventional panel. However, since the surface area of the glass layer 4 is limited, it is easier to polish the glass layer 4 according to this invention. Moreover, according to this invention, rear segment electrodes 2 can be formed by thick film technology, and usually have a thickness of several microns. This thickness is quite thick in comparison with that of the thin segment electrodes formed on a glass substrate in a conventional panel by using thin film technology (vacuum deposition). Therefore, even if the surface roughness of the glass layer 4 is bad and there are flaws on the surface of the glass layer 4, the flaws are not viewable through the liquid crystal on the segment electrodes.

On the glass layer 4, segment electrodes 2 are formed in a pattern to form the desired display. For a numerical display, a well known 8-segment pattern is desired. A preferred method therefor is to apply conductive paste in a desired pattern such as shown in FIG. 2 e.g. by using screen printing at positions over the holes 12 in the glass layer 4; and heat them. For obtaining a smooth surface of each segment electrode 2, a conductive paste which is a so-called mirror paste can advantageously be used. A heating temperature not exceeding that for forming the glass layer 4 is used. For example, the heating temperature is between 550°C and 650°C with a heating time between 5 minutes and 20 minutes. However, this heating condition changes with a change in the kind of conductive paste, the kind of glass layer 4, etc. It is necessary to form the segment electrodes 2 so that they are electrically connected to the lead conductors 3. One of the advantages of this invention is that the segment electrodes can be formed on the glass layer 4 without forming the lead conductors 3 on the same surface of the glass layer 4. Thus, the shortest distance between adjacent segment electrodes 2 can be easily made shorter than in the prior art devices, and thick film electrodes which are stronger than thin film electrodes can be easily used for the segment electrodes 2. For example, the distance between adjacent segment electrodes 2 can be made, for example, 100 microns. The surfaces of the segment electrodes 2 are preferably polished by a per se well known method to align them in the same plane. The thickness of the segment electrodes 2 can be chosen as desired. For example, a thickness of 2 to 7 microns can be used. The segment electrodes 2 can be called rear segment electrodes, as compared with the counter electrodes provided in a later step which are called front electrodes because the counter electrodes are nearer to the eyes of observers during use of the panel. That is, the segment electrodes 2 are formed on one surface of the glass layer 4 which surface is opposite the surface of the glass layer 4 facing the ceramic substrate 1.

Thus the basic conductor arrangement for applying electric signals to the segment electrodes 2 is completed. Necessary electric signals can be applied to the segment electrodes through the lead conductors 3. The remaining necessary arrangements for completing the panel for a liquid crystal display device according to this invention can be carried out by a per se well known technique. A transparent glass plate 5 having a thickness such as 1 mm and having thin transparent electrodes 6 (front electrodes e.g. of $In_2O_3$ or $SnO_2$ with a thickness e.g. of 0.03 to 0.06 micron) and thin lead 9 on one surface thereof is prepared e.g. by vacuum deposition of $In_2O_3$ or $SnO_2$ on the glass plate 5. The number of thin transparent electrodes 6 is the same as the number of groups of segment electrodes 2, each group being provided for display of one number. In FIG. 2, for example, each group is composed of 8 segment electrodes 2, and the number of thin transparent electrodes 6 should be 6. As shown in FIG. 2, each group of 8 segment electrodes 2 are in a pattern which has the shape as a whole, of a rectangle. Therefore, each thin electrode 6 also has the form of thin rectangular film. The positions of the thin electrodes 6 on glass plate 5 are required to coincide the positions of the respective groups of segment electrodes 2, and when the glass plate 5 is mounted on the glass layer 4, each electrode 6 should be coextensive with each group of segment electrodes 2 in a plan view such as FIG. 2. The glass plate 5 is mounted on the glass layer 4 with a space such as 5 to 20 microns between the front electrodes 6 and the rear segment electrodes 2, e.g. by providing a spacing means 7 between the glass plate 5 and the glass layer 4. That is, there is formed a stack of the glass plate 5, spacing means 7 and glass layer 4. The spacing means 7 also acts as a seal for holding a liquid crystal in the chamber formed by the glass plate 5, spacing means 7 and the glass layer 4. The spacing means 7 can be a rectangular frame attached to all four edges of the surface of the glass layer 2. The spacing means 7 can also be made by providing several small spacer segments on the four edges of the surface of the glass layer 4. By stacking the glass plate 5 on the spacer segments and by applying adhesives to the spaces between spacer segments, a seal for holding a liquid crystal can be made. The thickness of the spacer means 7 is preferably between 7 and 25 microns. By placing a suitable liquid crystal in the chamber formed by the glass plate 5, the spacer means 7 and the glass layer 4, the panel is made into a liquid crystal display device. In FIG. 2, reference numeral 10 designates circuit elements such as an IC and an LSI, and reference numeral 11 designates lead terminals.

The following EXAMPLE is for illustrating this invention only, and is not to be construed to limit thereby the scope of this invention.

EXAMPLE

Referring to FIGS. 1 and 2, an alumina ceramic plate 1 1.5 mm thick having deviations from the surface flatness of less than 10 microns was prepared. Conductive paste containing silver and glass frit was applied by screen printing to the flat surface of the alumina ceramic plate 1 in a pattern shown by reference numerals 3 and 8, and heated at a temperature of 810°C for 10 minutes. Thus, lead conductors 3 and 8 having a thickness of 10 microns and a width of 150 microns were made on the alumina ceramic plate 1. The shortest distance between adjacent lead conductors 3 was about 100 microns. Over the lead conductors 3 and the alumina ceramic plate 1, a material for a black glass layer 4 (glass sold under the trade name DuPont No. 8190 containing an organic binder, an organic solvent and black pigment) was coated by printing in a manner such that holes 12 having a diameter of 400 microns were made so as to partially expose the lead conductors 3. The material for the black glass layer 4 was heated at a temperature of 810°C for 10 minutes, and had a thickness of 20 microns. Th holes 12 were filled with a conductive paste sold under the trade name of Syoei No. 7350 by printing and the paste was heated at a temperature of 810°C for 10 minutes. The black glass layer 4 was polished by using a diamond paste so as to have deviations from the surface flatness of less than 1 micron. On the black glass layer 4, conductive paste sold under the trade name ESL Mirror Paste No. 8080 was applied by screen printing in a pattern shown by reference numeral 2 so as to cover the holes 12 and the paste was heated at a temperature of 600°C for 10 minutes. Thus, segment electrodes 2 having a thickness of 6 microns were made on the black glass layer 4 which were electrically connected to the lead conductors 3 by the conductors in the holes 12. The shortest distance between adjacent segment electrodes 2 was about 100 microns. The surfaces of the segment electrodes 2 were polished so as to align them in the same plane. A transparent glass plate 5 which was 1 mm thick having thin transparent electrodes 6 of $In_2O_3$ which are 0.05 microns thick on one surface thereof was prepared by a per se well known method. This transparent glass plate 5 was attached to the glass layer 4 by a spacer means 7 with the electrodes 6 and 2 opposed to each other at a spacing of 14 microns. The thickness of the spacer means 7 was 20 microns. Thus, a panel for a liquid crystal display device was made. The chamber formed by the glass plate 5, spacer means 7 and glass layer 4, was filled with a liquid crystal and sealed. Thereby, a superior liquid crystal display device was made.

What is claimed is:

1. A panel for a liquid crystal display device, comprising: a ceramic substrate; lead conductors on one surface of said ceramic substrate; an insulating glass layer on said ceramic substrate and covering said lead conductors, said glass layer having electrical conductors therein which are spaced from each other and are electrically connected to the respective lead conductors and extend through the thickness of said glass layer; rear segment electrodes on the surface of said glass layer opposite to the surface of said glass layer facing said ceramic substrate and in a pattern to form the desired display; a spacer on said substrate around said rear segment electrodes; and a transparent glass plate having transparent front electrodes on one surface thereof on said spacer with said front electrodes facing said rear segment electrodes and spaced therefrom, the space between said glass layer and said glass plate and within said spacer being adapted to be filled with a liquid crystal, said front and rear segment electrodes being for exciting the liquid crystal.

2. A panel according to claim 1, wherein said insulating glass layer contains a colored pigment.

3. A panel according to claim 2, wherein said colored pigment is black pigment.

4. A panel according to claim 1, wherein said ceramic substrate is a ceramic taken from the group consisting of alumina and forsterite.

5. A method of making a panel for a liquid crystal display device, comprising: forming lead conductors on one surface of a ceramic substrate; covering said lead conductors and said ceramic substrate with an insulating glass layer having holes therethrough which are spaced from each other and which are aligned with parts of the respective lead conductors; filling said holes with conductive material in electrical contact with the respective lead conductors; forming rear segment electrodes on the surface of said glass layer opposite the surface of said glass layer facing said ceramic substrate in a pattern for producing the desired display, attaching a spacer to said substrate around said rear segment electrodes, and attaching a transparent glass plate having transparent front electrodes on one surface thereof to said spacer with said front electrodes facing said rear segment electrodes.

6. A method according to claim 5, wherein said lead conductors are formed by printing conductive past on said substrate and heating said conductive paste.

7. A method according to claim 5, wherein said insulating glass layer is formed by printing a material including glass frit over said lead conductors and said ceramic substrate and heating said material.

8. A method according to claim 5, wherein said material for said layer includes a colored pigment.

9. A method according to claim 8, wherein said colored pigment is black pigment.

10. A method according to claim 5, wherein said rear segment electrodes are formed by printing conductive paste in a pattern of segments and heating said conductive paste.

* * * * *